United States Patent US 10,943,335 B2
Nishimura et al. Mar. 9, 2021

(54) HYBRID TONE MAPPING FOR CONSISTENT TONE REPRODUCTION OF SCENES IN CAMERA SYSTEMS

(71) Applicant: Intel Corporation, Santa Clara, CA (US)

(72) Inventors: Jun Nishimura, San Jose, CA (US); Aleksandar Sutic, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 179 days.

(21) Appl. No.: 16/010,335

(22) Filed: Jun. 15, 2018

(65) Prior Publication Data

US 2019/0043177 A1    Feb. 7, 2019

(51) Int. Cl.
*G06T 5/00* (2006.01)
*G06T 5/40* (2006.01)
*G06T 5/50* (2006.01)
*H04N 5/235* (2006.01)

(52) U.S. Cl.
CPC .............. *G06T 5/009* (2013.01); *G06T 5/007* (2013.01); *G06T 5/008* (2013.01); *G06T 5/40* (2013.01); *G06T 5/50* (2013.01); *G06T 2207/10016* (2013.01); *G06T 2207/20016* (2013.01); *G06T 2207/20208* (2013.01); *G06T 2207/20221* (2013.01); *H04N 5/2355* (2013.01)

(58) Field of Classification Search
CPC .. G06T 5/40; G06T 5/50; G06T 5/007; G06T 5/008; G06T 5/009; G06T 2207/10016; G06T 2207/20016; G06T 2207/20208; H04N 5/2354; H04N 5/2355
USPC ......................................................... 382/274
See application file for complete search history.

(56) References Cited

U.S. PATENT DOCUMENTS

| | | | |
|---|---|---|---|
| 9,076,224 B1 * | 7/2015 | Shah | G06T 5/009 |
| 2011/0285866 A1 * | 11/2011 | Bhrugumalla | H04N 5/23232 348/218.1 |
| 2013/0329093 A1 * | 12/2013 | Zhang | H04N 5/2355 348/241 |
| 2015/0078661 A1 * | 3/2015 | Granados | G06T 5/009 382/167 |
| 2019/0068865 A1 * | 2/2019 | Guerin | G06T 5/008 |
| 2019/0108622 A1 * | 4/2019 | Douady-Pleven | G06T 5/002 |

* cited by examiner

*Primary Examiner* — Ali Bayat
(74) *Attorney, Agent, or Firm* — Jaffery Watson Mendonsa & Hamilton LLP

(57) ABSTRACT

A mechanism is described for facilitating hybrid tone mapping in camera systems according to one embodiment. A method of embodiments, as described herein, includes detecting a scene having a sequence of frames, and fusing the sequence of frames into a fused raw frame. The method may further include reconstructing the scene by performing global tone mapping and local tone mapping on the fused raw frame, and outputting an image reflecting the reconstructed scene based on the tone-mapped raw frame.

20 Claims, 11 Drawing Sheets

HYBRID TONE MAPPING FOR CONSISTENT TONE REPRODUCTION OF SCENES IN CAMERA SYSTEMS

FIELD

Embodiments described herein relate generally to data processing and more particularly to facilitate hybrid tone mapping for consistent tone reproduction of scenes in camera systems.

BACKGROUND

In burst photography, scene reproduction consistency is regarded as critical in ensuring image quality for end-users. Captured scenes typically demonstrate different dynamic ranges, such as a high dynamic range, where a dynamic range is compressed in a consistent manner to ensure stability in performance of any potential processes and operations. However, conventional solutions typically result in insufficient dynamic range compression, over-amplification of dark region, and lack of global and local contrasts.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
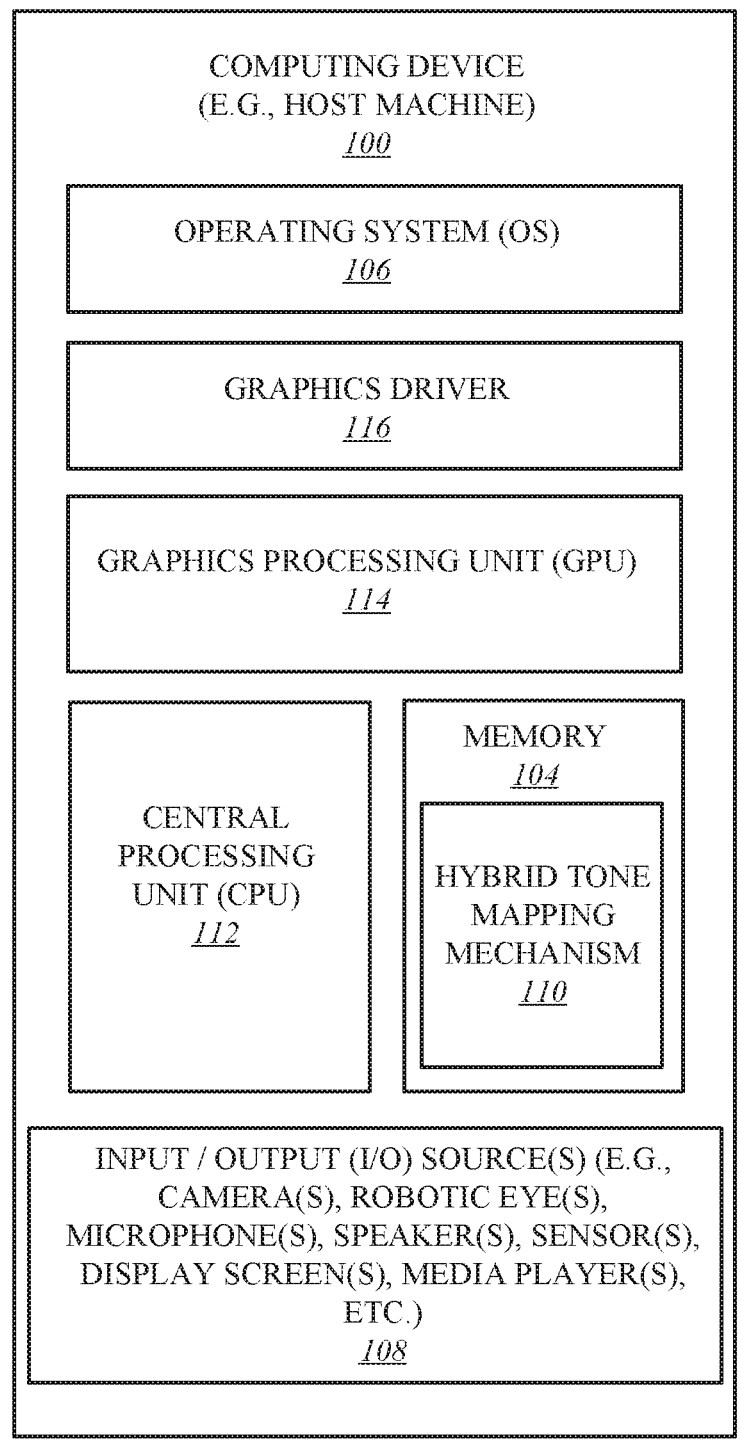
FIG. 1 illustrates a computing device employing a hybrid tone mapping mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for hybrid tone mapping (HTM) that is a combination of global tone mapping (GTM) and local tone mapping (LTM), where consistent appearance is produced for all different scenes, while adding support for local contrast and enabling farther scene reproduction consistency with more flexible nonlinear weighting of dynamic range scaling functions.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a hybrid tone mapping mechanism ("hybrid mechanism") 110 according to one embodiment. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, or the like, as well as input/output (I/O) sources 108, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "circuitry", and "mechanism" may include, by way of example, software or hardware and/or a combination thereof, such as firmware.

In one embodiment, as illustrated, hybrid mechanism 110 may be hosted by memory 104 in communication with I/O source(s) 108, such as microphones, speakers, etc., of computing device 100. In another embodiment, hybrid mechanism 110 may be part of or hosted by operating system 106. In yet another embodiment, hybrid mechanism 110 may be hosted or facilitated by graphics driver 116. In yet another embodiment, hybrid mechanism 110 may be hosted by or part of graphics processing unit ("GPU" or simply graphics processor") 114 or firmware of graphics processor 114. For example, hybrid mechanism 110 may be embedded in or implemented as part of the processing hardware of graphics processor 114. Similarly, in yet another embodiment, hybrid mechanism 110 may be hosted by or part of central processing unit ("CPU" or simply "application processor") 112. For example, hybrid mechanism 110 may be embedded in or implemented as part of the processing hardware of application processor 112.

In yet another embodiment, hybrid mechanism 110 may be hosted by or part of any number and type of components of computing device 100, such as a portion of hybrid mechanism 110 may be hosted by or part of operating system 116, another portion may be hosted by or part of graphics processor 114, another portion may be hosted by or part of application processor 112, while one or more portions of hybrid mechanism 110 may be hosted by or part of operating system 116 and/or any number and type of devices of computing device 100. It is contemplated that embodiments are not limited to certain implementation or hosting of hybrid mechanism 110 and that one or more portions or components of hybrid mechanism 110 may be employed or implemented as hardware, software, or any combination thereof, such as firmware.

Computing device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
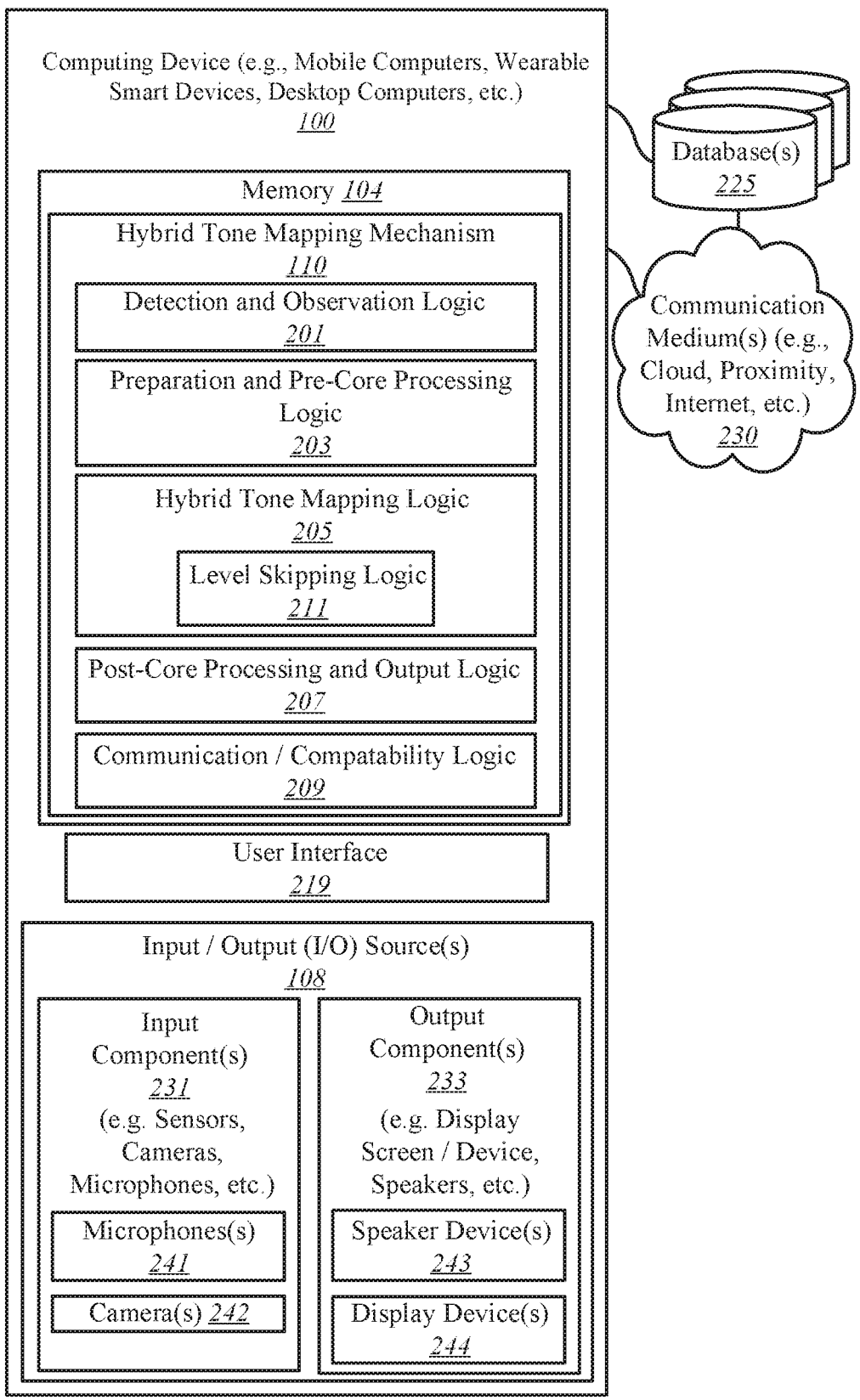
FIG. 2 illustrates a hybrid tone mapping mechanism according to one embodiment.

FIG. 2 illustrates hybrid tone mapping mechanism 110 of FIG. 1 according to one embodiment. For brevity, many of the details already discussed with reference to FIG. 1 are not repeated or discussed hereafter. In one embodiment, hybrid mechanism 110 may include any number and type of components, such as (without limitations): detection and observation logic 201; preparation and pre-core processing logic ("pre-core logic") 203; hybrid tone mapping logic ("hybrid mapping logic") 205 including level skipping logic 211; post-core processing and output logic ("post-core logic") 207; and communication/compatibility logic 209.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", and "mechanism" may include, by way of example, software or hardware and/or a combination thereof, such as firmware. For example, logic may itself be or include or be associated with circuitry at one or more devices, such as application processor 112 and/or graphics processor 114 of FIG. 1, to facilitate or execute the corresponding logic to perform certain tasks, such as level skipping circuitry may facilitate or execute level skipping logic 211 to perform level skipping-related operations or alternatively, level skipping logic 211 itself may include or be that circuitry.

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

It is contemplated that embodiments are not limited to any number or type of microphone(s) 241, camera(s) 243, speaker(s) 243, display(s) 244, etc. For example, as facilitated by detection and observation logic 201, one or more of microphone(s) 241 may be used to detect speech or sound simultaneously from users, such as speakers. Similarly, as facilitated by detection and observation logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or a video stream.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

There are several conventional technologies that provide for scene reproduction, but they often result in insufficient dynamic range compression (such as due to Gaussian weighting of the linear scale factor always peaking at the average log luminance), over-amplification of dark region and lack of global contrast (due to simple Gaussian weighting being not enough for producing good global contrast), lack of local contrast (due to having no local contrast support).

Embodiments provide for a novel technique for hybrid tone mapping, including global and local tone mappings, where consistent appearance is produced for all different scenes, while adding support for local contrast and enabling farther scene reproduction consistency with more flexible nonlinear weighting of dynamic range scaling functions.

This novel technique, when applied, allows for enabling nonlinear dynamic range compression with consistent scene reproduction capability. For example, this novel technique is computationally efficient and can be implemented and productized as part of software-based burst photography solution (e.g., burst image signal processor (ISP)), where this ISP can be applied to various computing platforms.

For example, detection and observation logic 201 may be used for detection or reception of images of scenes having objects using one or more input components 231, such as camera(s) 242. Once the images are captured, a raw frame sequence of such images may then be inputted (e.g., Bayer input) for further processing, such as multi-frame fusion, hybrid tone mapping, image signal processing, and ending with outputting of a red green blue (RGB) frame.

For example, pre-core logic 203 may be used to first perform multi-frame fusion of the raw frame sequence to prepare for pre-processing or pre-core processing operations. In one embodiment, pre-core processing, as facilitated by pre-core logic 203, may be used for robustly applying local contrast enhancement, such as in case of Bayer inputs, and once white balance (WB) is applied to an input image, the image is then converted into luma Y, where luma is then further converted into "scaled log domain" (as opposed to the conventional simple log domain), where the scaled log domain is defined as:

$$L_s = 1.0 + \log([Y]_\epsilon^{1.0})/s$$

Where s is often defined as $|\log(\epsilon)|$.

Further, input dynamic range estimate input dynamic range estimate $DR_{input}$ and linear dynamic range scaling factor $k_1$ may be calculated through a global tone mapping control block. In one embodiment, GTM control block may provide three parameters, such as a is ratio of the dynamic range to the user parameter $c_1$, μ is average of log luminance, $k_1$ is linear dynamic range scaling factor, as further illustrated in FIG. 3D.

For example, in one embodiment, as facilitated by pre-core logic 203, pre-core processing operations include luminance computation that involves estimation of approximate luminance signal by filtering raw frame with a log-pass filter along with dividing the raw frame into M×N tiles and calculating average R, G, and B channel values within each time. Using these values to compute average (Yavg) and maximal (Ymax) values of the channels.

In one embodiment pre-core processing operations of hybrid tone mapping may further include computing any control parameters for overall image appearance by using a frame statistics grid, while a scene's luminance histogram is used to estimate its dynamic range, from which the scaling factor and user compression preference are derived. For example, an average luminance values are also computed as part of the control as facilitated by pre-core logic 203. Additionally, weight is computed by making the center of Gaussian weighting adaptive to the input dynamic range as facilitated by pre-core logic 203.

Upon completing pre-core processing operations of hybrid tone mapping, the core part of hybrid tone mapping commences, as facilitated by hybrid logic 205, where Gaussian pyramid is calculated on scaled log luminance $L_s$. In one embodiment, hybrid logic 205 may use one or more techniques (e.g., fast local Laplacian filter technique) to facilitated remapping of the input image, including a novel technique of level skipping as facilitated by level skipping logic 211. For example, as illustrated in FIG. 3B, level skipping is introduced on the remapping to make local tone mapping efficient by merely using the necessary levels for required spatial frequency to be enhanced and, for example, depending on the spatial frequency support of the ISP, certain level may be skipped during remapping. This novel technique for level skipping, as facilitated by level skipping logic 211, makes the entire process much more efficient in terms of consumption of resources, such as time, power, bandwidth, etc.

Further, in one embodiment, as facilitated by hybrid logic 205, Gaussian pyramid computation is build using classical Gaussian pyramid through low-pass filtering and decimating the input log-luminance signal, followed by performing scale-space tone remapping by inputting the Gaussian pyramid by applying tunable and locally-adaptive non-linear curves. This process is then further followed by Laplacian pyramid computation, as facilitated by hybrid logic 205, where a Laplacian pyramid is generated from a remapped Gaussian pyramid. In one embodiment, as facilitated by hybrid logic 205, weight is computed by making the center of the Gaussian weighting adaptive to the input dynamic range to achieve dynamic range scale factor computation, and then applying the scaling on the top level of the Laplacian pyramid for dynamic range scaling.

In one embodiment, this novel hybrid tone mapping, which includes a combination of hybrid and local tone mappings, where the local tone mapping gain is calculated based on the fixed mapping of scaled log luminance and not dependent on the highly scene dependent global tone mapping, where two components are combined, but well-decoupled to ensure the consistent scene reproduction. Further, for example, the Laplacian pyramid may be calculated on the remapped image, where before reconstructing to the full resolution luma image, global tone mapping is applied.

Upon completing the core operations of hybrid tone mapping, post-core processing and outputting operations are triggered, where, for example, a new log-luminance Laplacian pyramid is reconstructed into an output log-luminance as facilitated by post-core logic 207. This is followed by gain map computation by post-core logic 207, where gain is regarded as the ration between the input and the output luminance and is applied to the input raw frame to obtain an output including a tone-mapped raw frame that is then sent over for viewing by end-users using one or more display screens, such as display device(s) 244.

Further, input component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that works with one or more of an operating system, a graphics driver, etc., of a computing device, such as voice-enabled device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "hybrid tone mapping", "HTM", "global tone mapping", "GTM", "local tone mapping", "LTM", "pre-core processing", "post-core processing", "scene tone reproduction", "scene reproduction", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from hybrid mechanism 110 to facilitate various embodiments including adding, removing, and/or enhancing certain features. For brevity, clarity, and ease of understanding of hybrid mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

Figure 3A:
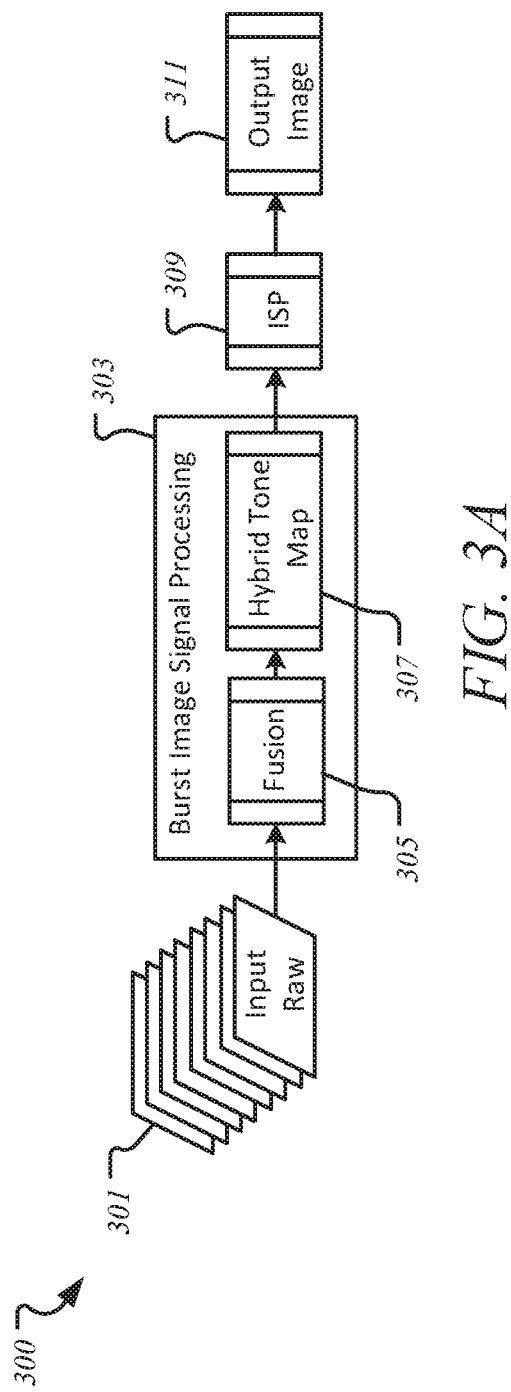
FIG. 3A illustrates a transaction sequence for scene tone reproduction through hybrid tone mapping according to one embodiment.
Figure 3B:
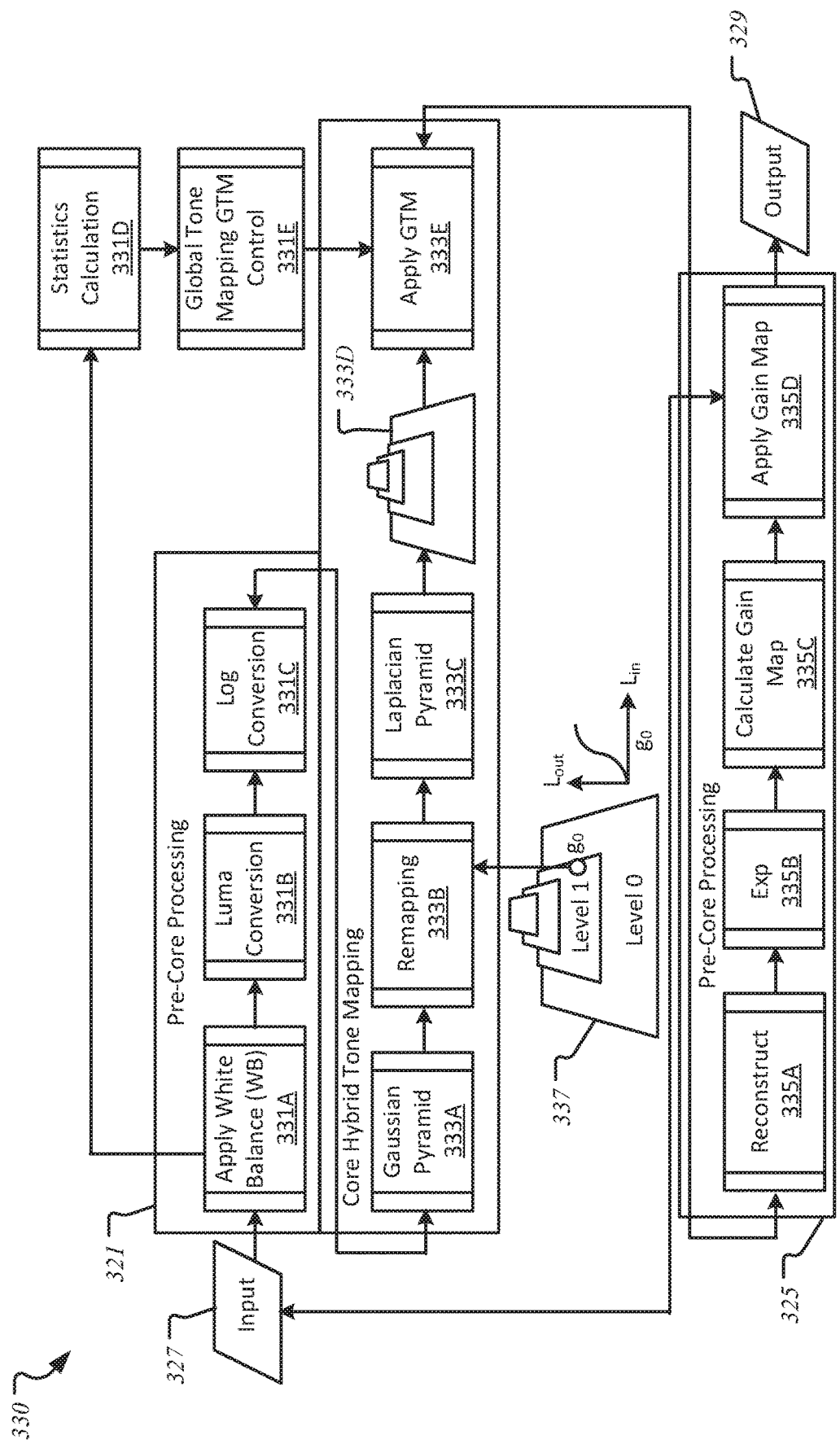
FIG. 3B illustrates a transaction sequence for scene tone reproduction through hybrid tone mapping according to one embodiment.

FIG. 3A illustrates a transaction sequence 300 for scene tone reproduction through hybrid tone mapping according to one embodiment. For brevity, many of the details previously discussed with reference to FIGS. 1-2 may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by hybrid mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

As illustrated and described with reference to FIG. 2, transaction sequence 300 begins with an input of raw frames 301 that then goes through an ISP, such as burst ISP 303, where raw frames 301 are put through the operations of fusion 305 and hybrid tone mapping 307, as previously described with reference to FIG. 2. Upon completing hybrid tone mapping 307, the remapped frames are put through ISP 309 to generate output image 311 that is then delivered for viewing by users using a display device.

FIG. 3B illustrates a transaction sequence 330 for scene tone reproduction through hybrid tone mapping according to one embodiment. Continuing with FIG. 3A, transaction sequence 330 of FIG. 3B illustrates an expanded and detailed view of hybrid tone mapping that includes multiple stages, such as pre-core processing 321, core HTM 323, and post-core processing 325. As illustrated, input 327 is received and processed at the first stage of pre-core processing 321 for application of WB 331A, luma conversion 331B (such as converting the input into luma Y), and log conversion 331C (such as converting the luma into scaled log domain), as previously described with reference to FIG. 2. Additional operations at pre-core processing 321 may also include statistics calculation 331D and GTM control 331E.

In one embodiment, the next stage of core HTM 323 is then triggered with Gaussian pyramid generation 333A, remapping 333B of Gaussian pyramid 337, and resulting in Laplacian pyramid generation 333C, where Laplacian pyramid 333D is then applied GTM 333E. In one embodiment, transaction sequence 330 then enters into the stage of pose-core processing 325 where a number of operations are performed, such as luminance Laplacian pyramid reconstruction 335A, exponential application 335B, gain map calculation 335C, and gain map application 335D, as described with reference to FIG. 2, which then produces output 329 for display and viewing.

Figure 3C:
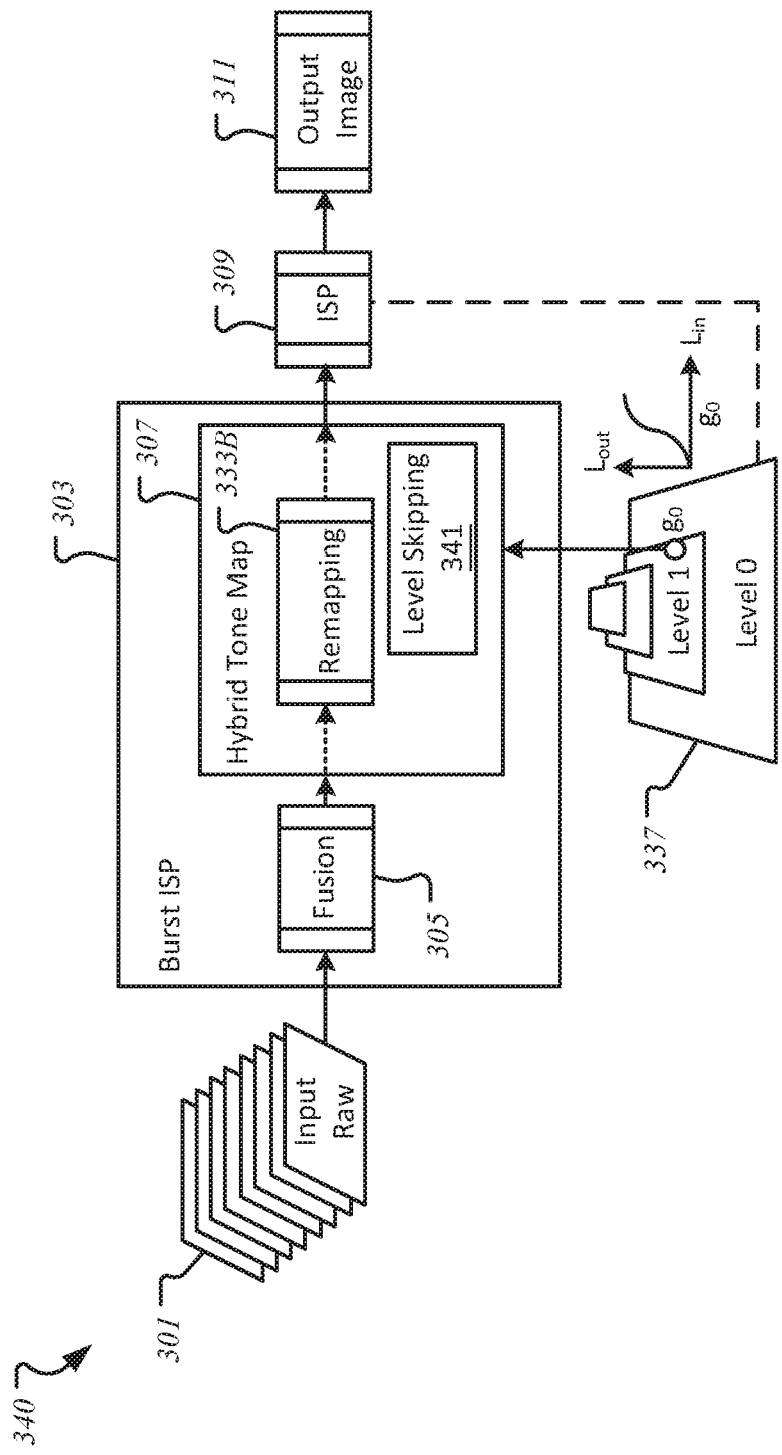
FIG. 3C illustrates a transaction sequence for scene tone reproduction through hybrid tone mapping according to one embodiment.

FIG. 3C illustrates a transaction sequence 340 for scene tone reproduction through hybrid tone mapping according to one embodiment. In this illustrated embodiment, raw frame input 301 is received and then processed for fusion 305 and HTM 307 at burst ISP 303. In one embodiment, the stage of remapping 333B of HTM 307 may perform a novel technique of level skipping 341 based on pyramid 337, such as a Gaussian pyramid. In one embodiment, this novel technique for level skipping can skip certain levels in pyramid 337 if such levels are deemed as unnecessary, while any necessary levels are kept and used for spatial frequency to be enhanced. Depending on the spatial frequency support of burst ISP 303, certain unnecessary levels are skipped during remapping. For example, curtained levels that may not be expected to be visible to the user may be regarded as unnecessary and skipped. Upon completion of HTM 307, the remapped image is further processed at ISP 307 and the resulting output image 311 is produced and then to the end-user for displaying and viewing.

Figure 3D:
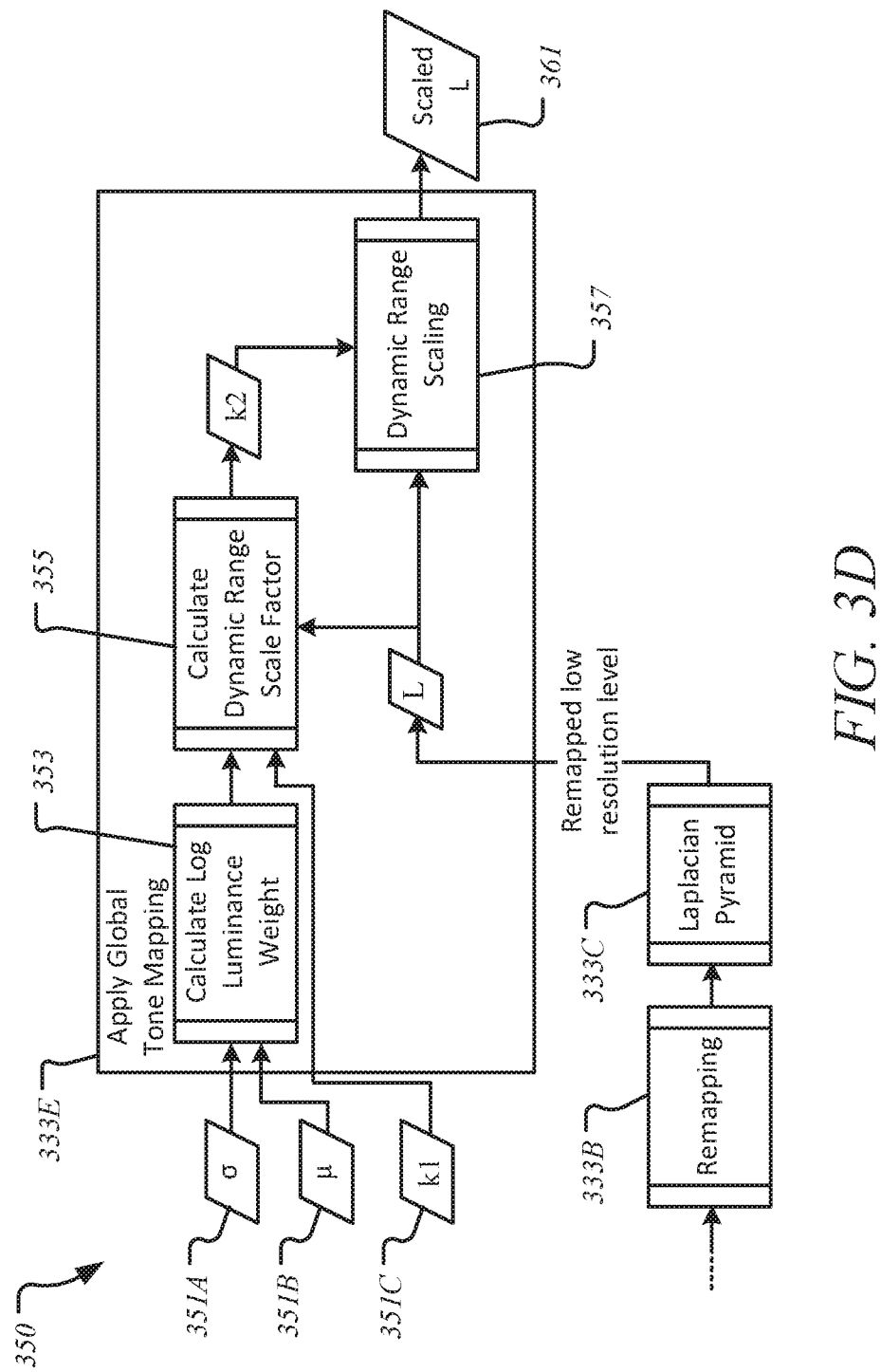
FIG. 3D illustrates a transaction sequence for scene tone reproduction through hybrid tone mapping according to one embodiment.

FIG. 3D illustrates a transaction sequence 350 for scene tone reproduction through hybrid tone mapping according to one embodiment. This illustrated embodiment provides for GTM application block 333E for inputs 351A, 351B, 351C, where GTM application block 333E may provide certain parameters, wherein a is ratio of the dynamic range to the user parameter $c_1$, $\mu$ is average of log luminance, $k_1$ is linear dynamic range scaling factor. Further, for example, GTM application block 333E may be used to resolve a conventional issue of lack of local contrast (due to no local support) and include multiple sub-blocks like log luminance weight calculation sub-block 353, dynamic range scale factor calculation sub-block 355, and dynamic range scaling block 357.

Similarly, for example, log luminance weight calculation sub-block 353 resolves a couple of conventional issues of insufficient dynamic range compression and over-amplification of dark region and lack of global contrast by getting the center of Gaussian weighing to be adaptive with the input dynamic range and improving the global contrast through additional threshold, respectively. The illustrated transaction sequence 350 continues with dynamic range scaling 357 offering scaled results 361 and remapping at low resolution level for generating Laplacian pyramid 333C, remapping 333B, and other operations as illustrated with respect to FIG. 3A.

Figure 3E:
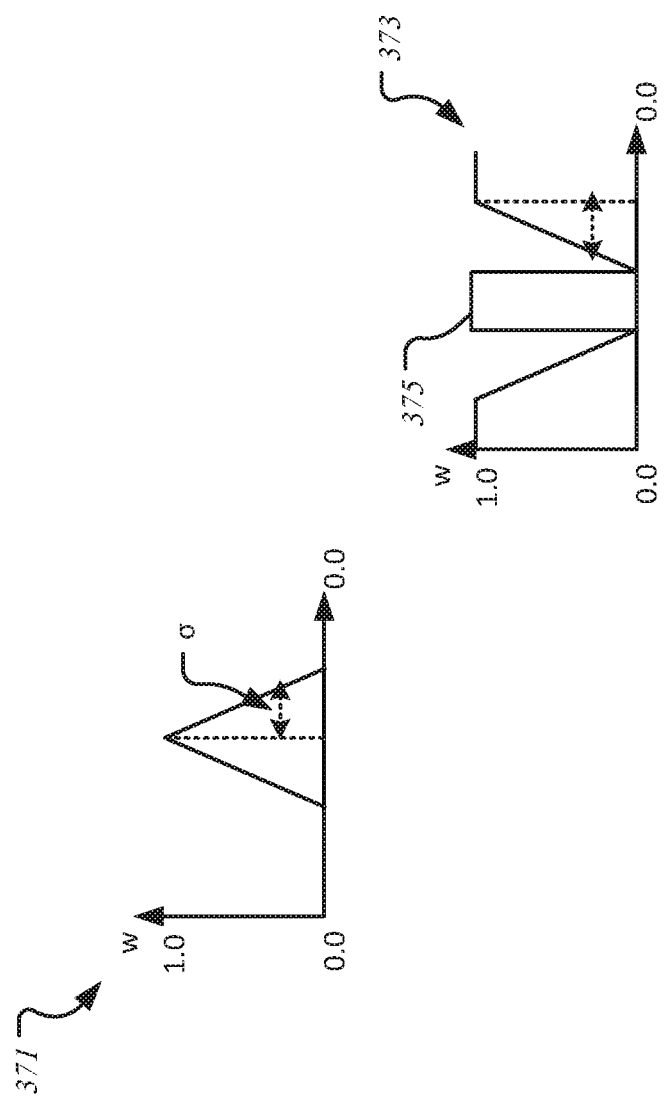
FIG. 3E illustrates graphs indicating conventional weight function and novel weight function, respectively, according to one embodiment.

FIG. 3E illustrates graphs 371 and 373 indicating conventional weight function and novel weight function, respectively, according to one embodiment. As illustrated, graph 371 provides for convention weight function that can result dark images, such as without necessary or sufficient dynamic range compression, due to Gaussian weighting of the linear scale factor always peaking at the average log luminance that can result in inefficient dynamic range compression.

The illustrated graph 373 provides for a novel weight function where region 375 reflects an area getting the highest amount of GTM gain through a Laplacian pyramid that is reconstructed using the novel technique of hybrid tone mapping including global tone mapping and local tone mapping to generate a final image.

Figure 4A:
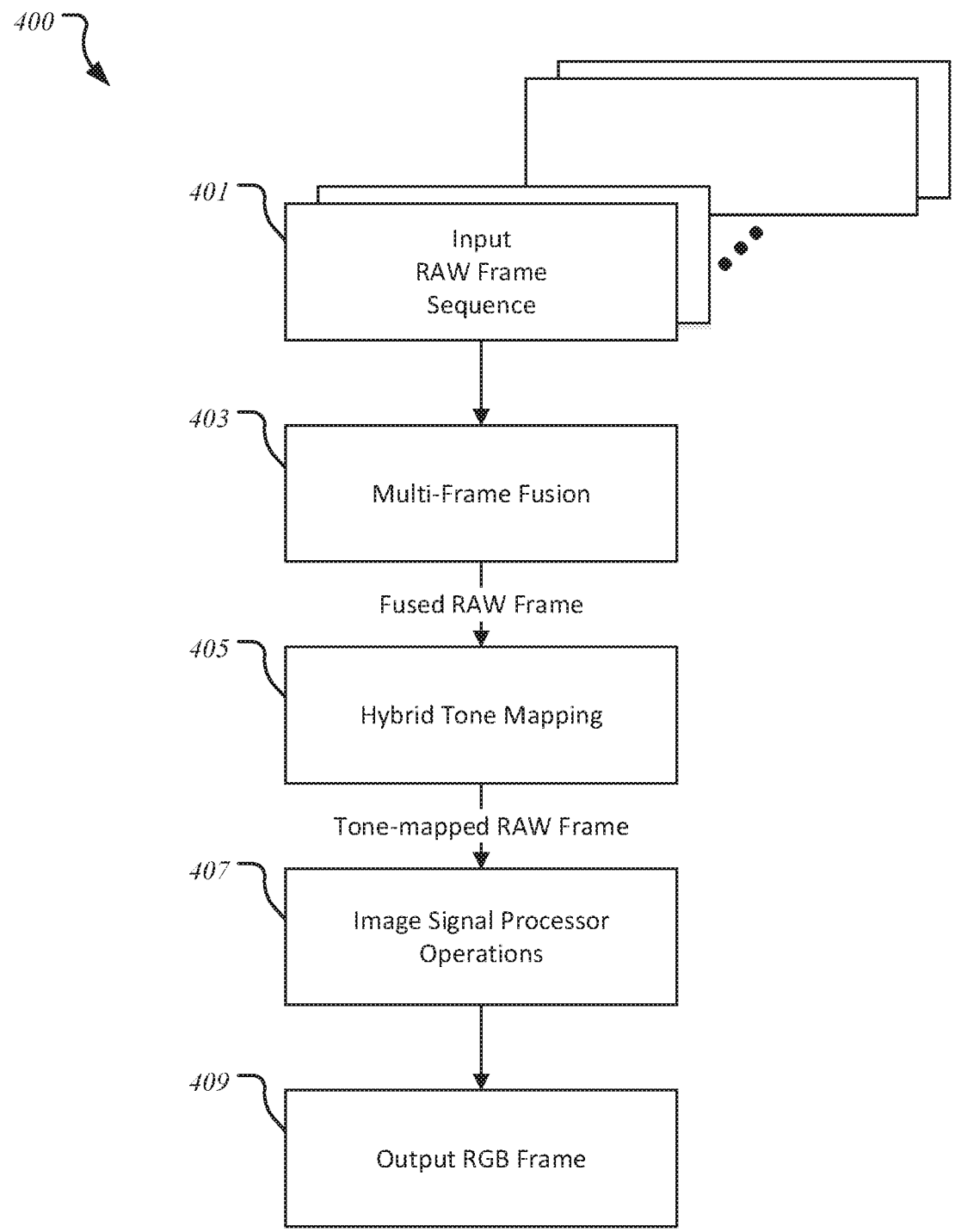
FIG. 4A illustrates a method for facilitating hybrid tone mapping according to one embodiment.

FIG. 4A illustrates a method 400 for facilitating hybrid tone mapping according to one embodiment. For brevity, many of the details previously discussed with reference to FIGS. 1-3E may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by hybrid mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

Method 400 starts at block 401 with inputting of a raw frame sequence that is then run through the operation of multi-frame fusion at block 403. In one embodiment, a fused frame resulting from the multi-frame fusion is then through the process of hybrid tone mapping involving both global tone mapping and local tone mapping at block 405 as described with reference FIG. 2. At block 407, a tone-mapped raw frame resulting the process of hybrid tone mapping is then put through further processing by image signal processing, resulting in outputting of an RGB frame at block 409.

Figure 4B:
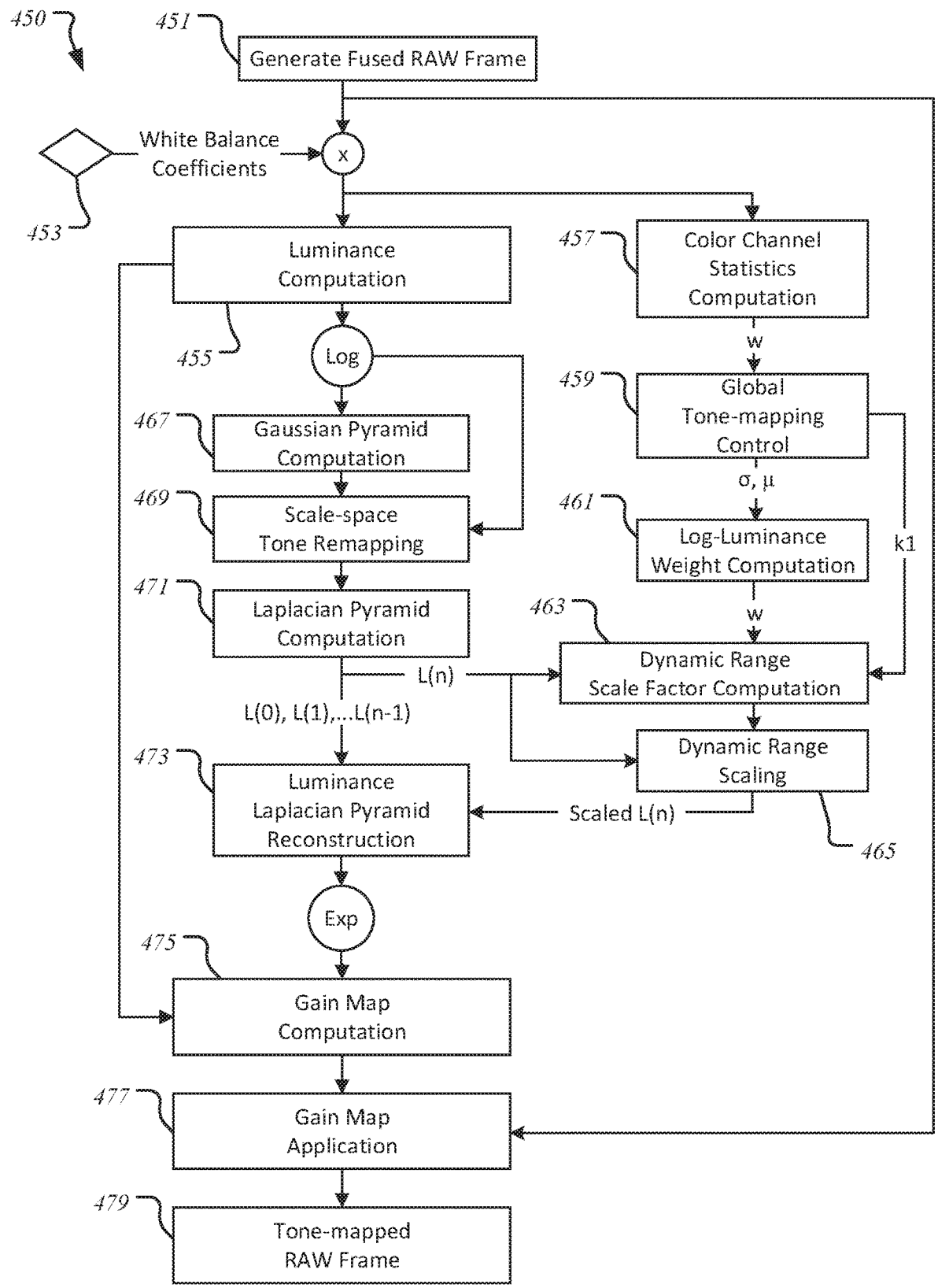
FIG. 4B illustrates a method for facilitating hybrid tone mapping according to one embodiment.

FIG. 4B illustrates a method 450 for facilitating hybrid tone mapping according to one embodiment. For brevity, many of the details previously discussed with reference to FIGS. 1-4 may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by hybrid mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

Method 450 begins at block 451 with generation of a fused raw frame through multi-frame fusion that is further based on an inputted raw frame sequence, where the fused raw frame is then assigned white balance coefficients at block 453. Upon assigning white balance coefficients, method 450 continues with luminance computation at block 455 and computation of color channel statistics at block 457. For example, block 455 may provide for estimation of an approximate luminance signal by filtering the raw frame with a low-pass filter, where this luminance computation is further used for computation of Gaussian pyramid at block 467 and computation of gain map at block 475.

Referring to block 457, color channel statistics are computed by dividing the raw frame into M×N tiles and calculating average R, G, and B channel values within each title, where these values are then used to compute an average value (Yav g) and a maximum value (Ymax) of the channels. These average and maximum values are then used for global tone mapping control at block 459, where the control parameters are computed for overall image appearance by using a frame statistics grid. Further, a scene luminance histogram is used to estimate its dynamic range, from which a scaling factor and user compression preference are obtained, where the average luminance values are also computed as part of the control. This is followed by computation of log-luminance weight at block 461, where the weight is computed by making the center of Gaussian weighting adaptive to the input dynamic range.

In one embodiment, method 450 continues with computation of dynamic range scale factor at block 463, where the weight is computed by making the center of the Gaussian weighting adaptive to the input dynamic range, followed by dynamic range scaling at block 465, wherein the scaling is applied on the top level of Laplacian pyramid.

Upon completion of the pre-core processing operations, in one embodiment, the core hybrid tone mapping is triggered with Gaussian pyramid computation at block 467, where a classical Gaussian pyramid is generated through low-pass filtering and decimating input log-luminance signals. The operation of core hybrid tone mapping continues at block 469 with scale-space tone remapping by remapping the input pyramid by applying a tunable and locally-adaptive non-linear curve. At block 471, a Laplacian pyramid is crated from remapping of the Gaussian pyramid, which then leads to the post-core processing operations, such as with reconstruction of the new log-luminance Laplacian pyramid into the output log-luminance using dynamic range scaling at block 473.

At block 475, gain map computation is performed, where the gain is regarded as the ratio between the input luminance and the output luminance, followed by application of the gain to the original input raw frame at block 477, outputting a tone-mapped raw frame at block 479 for displaying to the user using one or more display devices of a computing device.

Figure 5:
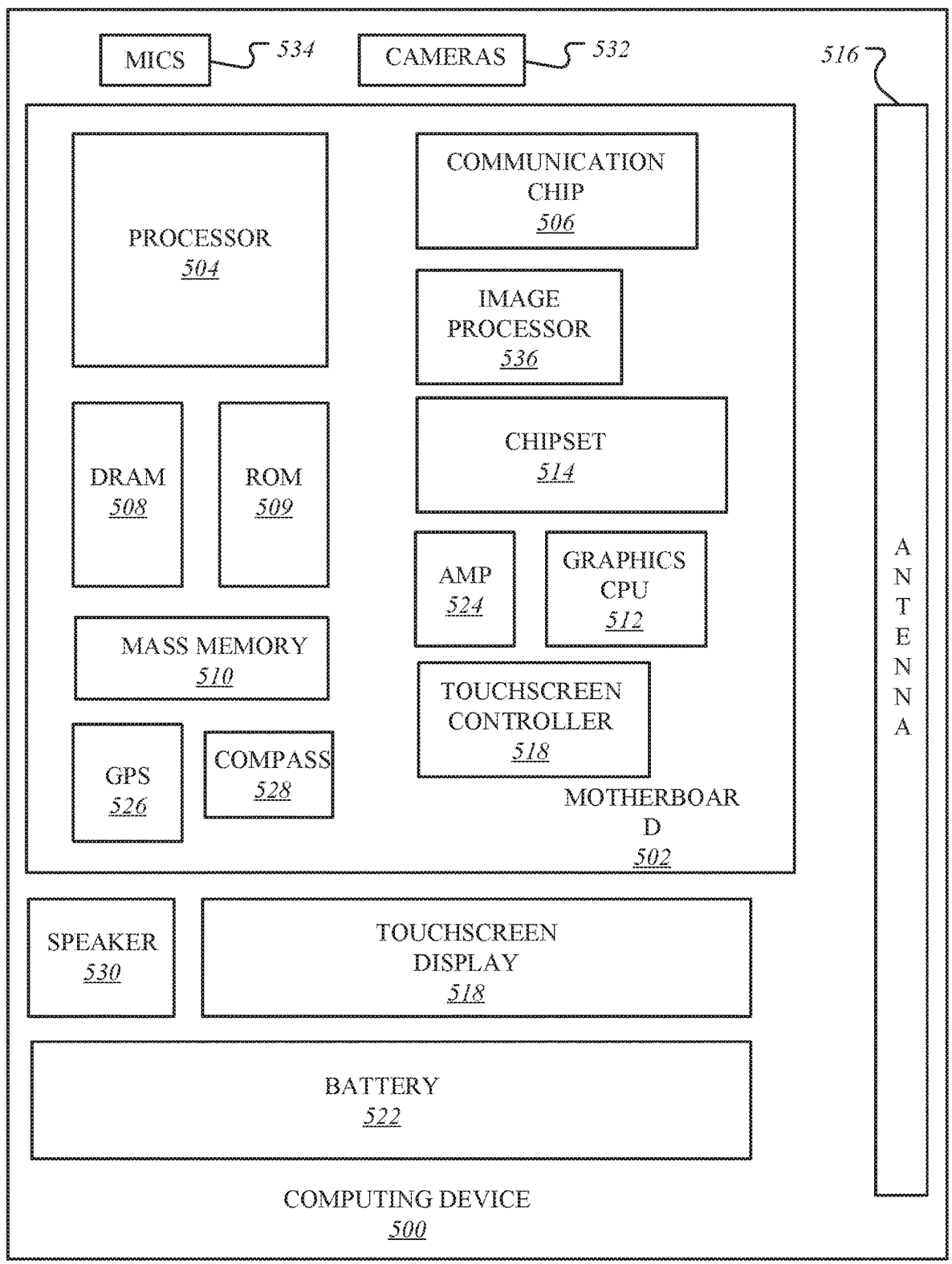
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
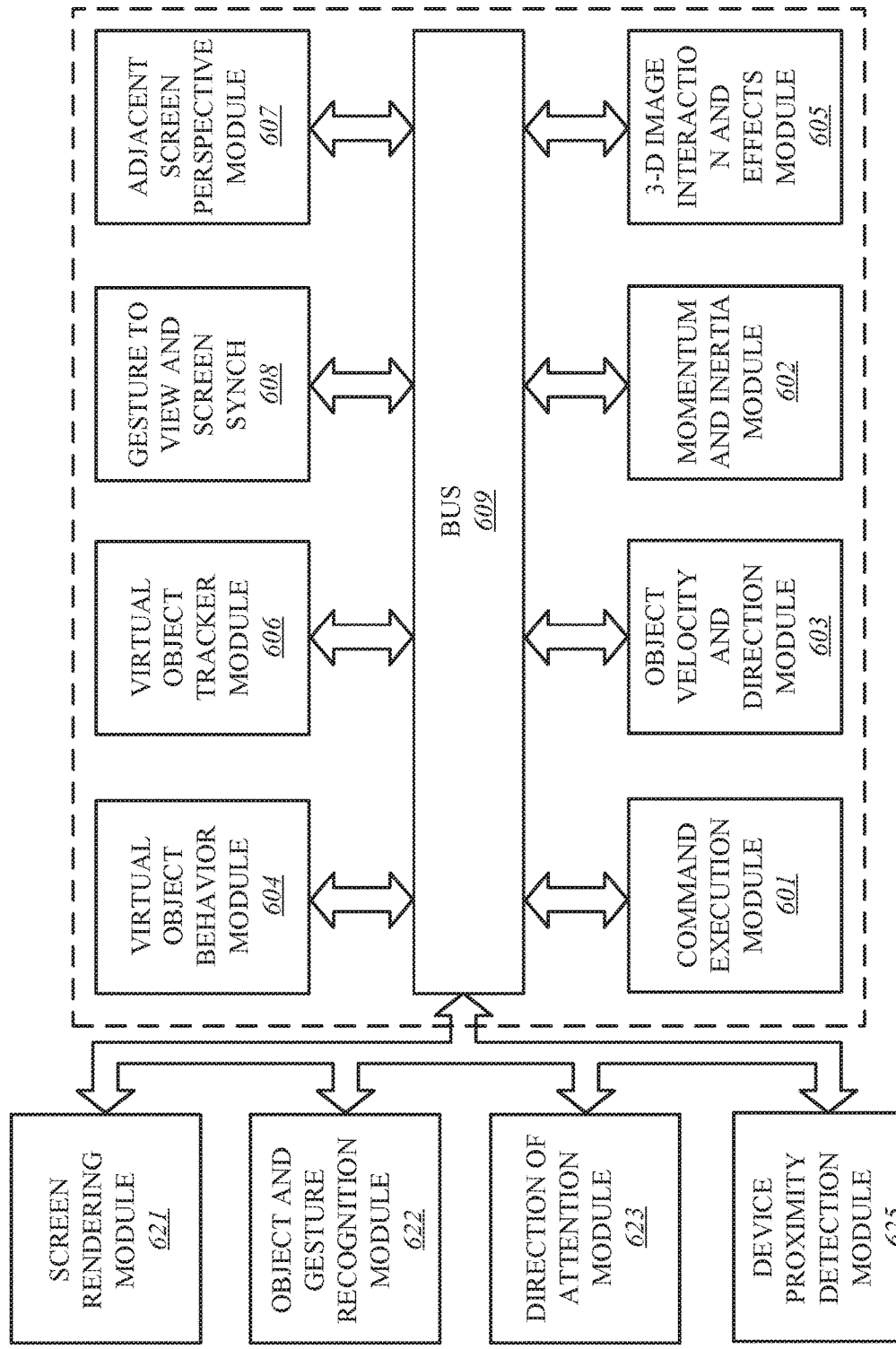
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate hybrid tone mapping in camera systems, the apparatus comprising: a processor coupled to memory hosting a mechanism for hybrid tone mapping, the processor to execute: detection and observation logic to detect a scene having a sequence of frames; preparation and pre-core processing logic ("pre-core logic") to fuse the sequence of frames into a fused raw frame; hybrid tone mapping logic ("hybrid logic") to reconstruct the scene by performing global tone mapping and local tone mapping on the fused raw frame; and post-core processing and output logic ("post-core logic") to output an image reflecting the reconstructed scene based on the tone-mapped raw frame.

Example 2 includes the subject matter of Example 1, wherein the processor is further to execute the pre-core logic to perform one or more computations to achieve global tone mapping and dynamic range scaling, wherein the one or more computations includes luminance computation, color channel statistics computation, log-luminance weight computation, and dynamic range scale factor computation.

Example 3 includes the subject matter of Examples 1-2, wherein the processor is further to execute the hybrid logic to: compute a Gaussian pyramid; remap the Gaussian pyramid based on scale-space tone remapping; and compute a Laplacian pyramid based on the remapped Gaussian pyramid.

Example 4 includes the subject matter of Examples 1-3, wherein the processor is further to execute the hybrid logic to: review a plurality of levels of the Gaussian pyramid to determine necessity of each level of the plurality of levels within the Gaussian pyramid; and skip one or more of the plurality of levels based on the necessity within the Gaussian pyramid.

Example 5 includes the subject matter of Examples 1-4, wherein the processor is further to execute the post-core logic to reconstruct a luminance Laplacian pyramid based on the computed Laplacian pyramid and one or more of the global tone mapping and dynamic range scaling.

Example 6 includes the subject matter of Examples 1-5, wherein the processor is further to: execute the post-core logic to compute and apply gain map based on the reconstructed luminance Laplacian pyramid; and output a tone-mapped raw frame using the applied gain map, wherein the tone-mapped raw frame is displayed using one or more display devices.

Example 7 includes the subject matter of Examples 1-6, wherein the processor comprises one or more of a graphics processor and an application processor, wherein the graphics processor and the application processor are co-located on a common semiconductor package.

Some embodiments pertain to Example 8 that includes a method facilitating hybrid tone mapping in camera systems, the method comprising: detecting a scene having a sequence of frames; fusing the sequence of frames into a fused raw frame; reconstructing the scene by performing global tone mapping and local tone mapping on the fused raw frame; and outputting an image reflecting the reconstructed scene based on the tone-mapped raw frame.

Example 9 includes the subject matter of Examples 8, further comprising performing one or more computations to achieve global tone mapping and dynamic range scaling, wherein the one or more computations includes luminance computation, color channel statistics computation, log-luminance weight computation, and dynamic range scale factor computation.

Example 10 includes the subject matter of Examples 8-9, further comprising: computing a Gaussian pyramid; remapping the Gaussian pyramid based on scale-space tone remapping; and computing a Laplacian pyramid based on the remapped Gaussian pyramid.

Example 11 includes the subject matter of Examples 8-10, further comprising: reviewing a plurality of levels of the Gaussian pyramid to determine necessity of each level of the plurality of levels within the Gaussian pyramid; and skipping one or more of the plurality of levels based on the necessity within the Gaussian pyramid.

Example 12 includes the subject matter of Examples 8-11, further comprising reconstructing a luminance Laplacian pyramid based on the computed Laplacian pyramid and one or more of the global tone mapping and dynamic range scaling.

Example 13 includes the subject matter of Examples 8-12, further comprising: computing and applying gain map based on the reconstructed luminance Laplacian pyramid; and outputting a tone-mapped raw frame using the applied gain map, wherein the tone-mapped raw frame is displayed using one or more display devices.

Example 14 includes the subject matter of Examples 8-13, wherein the method is executed by a processor comprising one or more of a graphics processor and an application processor, wherein the graphics processor and the application processor are co-located on a common semiconductor package of a computing device.

Some embodiments pertain to Example 15 that includes a data processing system comprising a processing device coupled to memory and a display device, the processing device to execute operations comprising: detecting a scene having a sequence of frames; fusing the sequence of frames into a fused raw frame; reconstructing the scene by performing global tone mapping and local tone mapping on the fused raw frame; and outputting an image reflecting the reconstructed scene based on the tone-mapped raw frame.

Example 16 includes the subject matter of Example 15, wherein the operations further comprise performing one or more computations to achieve global tone mapping and dynamic range scaling, wherein the one or more computations includes luminance computation, color channel statistics computation, log-luminance weight computation, and dynamic range scale factor computation.

Example 17 includes the subject matter of Examples 15-16, wherein the operations further comprise: computing a Gaussian pyramid; remapping the Gaussian pyramid based on scale-space tone remapping; and computing a Laplacian pyramid based on the remapped Gaussian pyramid.

Example 18 includes the subject matter of Examples 15-17, wherein the operations further comprise: reviewing a plurality of levels of the Gaussian pyramid to determine necessity of each level of the plurality of levels within the Gaussian pyramid; and skipping one or more of the plurality of levels based on the necessity within the Gaussian pyramid.

Example 19 includes the subject matter of Examples 15-18, wherein the operations further comprise reconstructing a luminance Laplacian pyramid based on the computed Laplacian pyramid and one or more of the global tone mapping and dynamic range scaling.

Example 20 includes the subject matter of Examples 15-19, wherein the operations further comprise: computing and applying gain map based on the reconstructed luminance Laplacian pyramid; and outputting a tone-mapped raw frame using the applied gain map, wherein the tone-mapped raw frame is displayed using one or more display devices.

Example 21 includes the subject matter of Examples 15-20, wherein the processing device comprises one or more of a graphics processor and an application processor, wherein the graphics processor and the application processor are co-located on a common semiconductor package of the data processing system.

Example 22 includes at least one non-transitory or tangible machine-readable medium comprising a plurality of instructions, when executed on a computing device, to implement or perform a method as claimed in any of claims or examples 8-14.

Example 23 includes at least one machine-readable medium comprising a plurality of instructions, when executed on a computing device, to implement or perform a method as claimed in any of claims or examples 8-14.

Example 24 includes a system comprising a mechanism to implement or perform a method as claimed in any of claims or examples 8-14.

Example 25 includes an apparatus comprising means for performing a method as claimed in any of claims or examples 8-14.

Example 26 includes a computing device arranged to implement or perform a method as claimed in any of claims or examples 8-14.

Example 27 includes a communications device arranged to implement or perform a method as claimed in any of claims or examples 8-14.

Example 28 includes at least one machine-readable medium comprising a plurality of instructions, when executed on a computing device, to implement or perform a method or realize an apparatus as claimed in any preceding claims.

Example 29 includes at least one non-transitory or tangible machine-readable medium comprising a plurality of instructions, when executed on a computing device, to implement or perform a method or realize an apparatus as claimed in any preceding claims.

Example 30 includes a system comprising a mechanism to implement or perform a method or realize an apparatus as claimed in any preceding claims.

Example 31 includes an apparatus comprising means to perform a method as claimed in any preceding claims.

Example 32 includes a computing device arranged to implement or perform a method or realize an apparatus as claimed in any preceding claims.

Example 33 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   a processor coupled to memory, the processor to:
   detect a scene having a sequence of frames;
   fuse the sequence of frames into a fused raw frame;
   reconstruct the scene by performing global tone mapping and local tone mapping on the fused raw frame, wherein the scene is reconstructed based on remapping of a Gaussian pyramid based on scale space tone remapping; and
   output an image reflecting the reconstructed scene based on the tone-mapped raw frame.

2. The apparatus of claim 1, wherein the processor is further to perform one or more computations to achieve global tone mapping and dynamic range scaling, wherein the one or more computations includes luminance computation, color channel statistics computation, log-luminance weight computation, and dynamic range scale factor computation.

3. The apparatus of claim 1, wherein the processor is further to:
   compute the Gaussian pyramid; and
   compute a Laplacian pyramid based on the remapped Gaussian pyramid.

4. The apparatus of claim 1, wherein the processor is further to:
   review a plurality of levels of the Gaussian pyramid to determine necessity of each level of the plurality of levels within the Gaussian pyramid; and
   skip one or more of the plurality of levels based on the necessity within the Gaussian pyramid.

5. The apparatus of claim 1, wherein the processor is further to reconstruct a luminance Laplacian pyramid based on the computed Laplacian pyramid and one or more of the global tone mapping and dynamic range scaling.

6. The apparatus of claim 5, wherein the processor is further to:
   compute and apply gain map based on the reconstructed luminance Laplacian pyramid; and
   output a tone-mapped raw frame using the applied gain map, wherein the tone-mapped raw frame is displayed using one or more display devices.

7. The apparatus of claim 1, wherein the processor comprises one or more of a graphics processor and an application processor, wherein the graphics processor and the application processor are co-located on a common semiconductor package.

8. A method comprising:
  detecting a scene having a sequence of frames;
  fusing the sequence of frames into a fused raw frame;
  reconstructing the scene by performing global tone mapping and local tone mapping on the fused raw frame, wherein the scene is reconstructed based on remapping of a Gaussian pyramid based on scale space tone remapping; and
  outputting an image reflecting the reconstructed scene based on the tone-mapped raw frame.

9. The method of claim 8, further comprising performing one or more computations to achieve global tone mapping and dynamic range scaling, wherein the one or more computations includes luminance computation, color channel statistics computation, log-luminance weight computation, and dynamic range scale factor computation.

10. The method of claim 8, further comprising:
  computing the Gaussian pyramid; and
  computing a Laplacian pyramid based on the remapped Gaussian pyramid.

11. The method of claim 8, further comprising:
  reviewing a plurality of levels of the Gaussian pyramid to determine necessity of each level of the plurality of levels within the Gaussian pyramid; and
  skipping one or more of the plurality of levels based on the necessity within the Gaussian pyramid.

12. The method of claim 8, further comprising reconstructing a luminance Laplacian pyramid based on the computed Laplacian pyramid and one or more of the global tone mapping and dynamic range scaling.

13. The method of claim 12, further comprising:
  computing and applying gain map based on the reconstructed luminance Laplacian pyramid; and
  outputting a tone-mapped raw frame using the applied gain map, wherein the tone-mapped raw frame is displayed using one or more display devices.

14. The method of claim 8, wherein the method is executed by a processor comprising one or more of a graphics processor and an application processor, wherein the graphics processor and the application processor are co-located on a common semiconductor package of a computing device.

15. At least one non-transitory machine-readable medium comprising instructions which, when executed by a computing device, cause the computing device to perform operations comprising:
  detecting a scene having a sequence of frames;
  fusing the sequence of frames into a fused raw frame;
  reconstructing the scene by performing global tone mapping and local tone mapping on the fused raw frame, wherein the scene is reconstructed based on remapping of a Gaussian pyramid based on scale space tone remapping; and
  outputting an image reflecting the reconstructed scene based on the tone-mapped raw frame.

16. The non-transitory machine-readable medium of claim 15, wherein the operations further comprise performing one or more computations to achieve global tone mapping and dynamic range scaling, wherein the one or more computations includes luminance computation, color channel statistics computation, log-luminance weight computation, and dynamic range scale factor computation.

17. The non-transitory machine-readable medium of claim 15, wherein the operations further comprise:
  computing the Gaussian pyramid; and
  computing a Laplacian pyramid based on the remapped Gaussian pyramid.

18. The non-transitory machine-readable medium of claim 15, wherein the operations further comprise:
  reviewing a plurality of levels of the Gaussian pyramid to determine necessity of each level of the plurality of levels within the Gaussian pyramid; and
  skipping one or more of the plurality of levels based on the necessity within the Gaussian pyramid.

19. The non-transitory machine-readable medium of claim 15, wherein the operations further comprise reconstructing a luminance Laplacian pyramid based on the computed Laplacian pyramid and one or more of the global tone mapping and dynamic range scaling.

20. The non-transitory machine-readable medium of claim 19, wherein the operations further comprise:
  computing and applying gain map based on the reconstructed luminance Laplacian pyramid; and
  outputting a tone-mapped raw frame using the applied gain map, wherein the tone-mapped raw frame is displayed using one or more display devices,
  wherein the operations are executed by a processor comprising one or more of a graphics processor and an application processor, wherein the graphics processor and the application processor are co-located on a common semiconductor package of the computing device.

* * * * *